May 30, 1944.  J. A. ZWISHENBERGER  2,350,208

VALVE

Filed March 31, 1942

Joseph A. Zwishenberger
INVENTOR.

BY Arthur F. Robert
ATTORNEY

Patented May 30, 1944

2,350,208

UNITED STATES PATENT OFFICE 2,350,208

VALVE

Joseph A. Zwishenberger, Louisville, Ky., assignor to Henry Vogt Machine Company, Louisville, Ky., a corporation of Kentucky Application March 31, 1942, Serial No. 437,069

7 Claims. (Cl. 251—50)

This invention relates to valves and more particularly to valves of the so-called bonnet type.

In prior valves of this general character which are primarily designed for use on high pressure steam lines, considerable difficulty has been experienced in both the initial packing and in the maintenance of the packing. In such prior valves, the bonnet has been secured to the valve housing by a bonnet nut, a lapped or gasket connection being provided between the housing end of the bonnet and the valve housing. The packing gland for the valve stem has been positioned within the bonnet yoke around the valve stem and has been forced into sealing position by a packing nut threaded on the bonnet yoke. It has been necessary to limit the dimensions of the bonnet yoke, not only to eliminate excess weight and avoid a clumsy appearance, but also because of the relatively small clearance between the outside dimension of the packing gland as measured in the bonnet yoke and the inside diameter of the bonnet nut. This limitation on thickness results in consequent weakness of the yoke with a corresponding inability to secure and maintain the packing gland as tight as desired. The yoke is further weakened by the necessity for cutting threads on it to engage the packing nut, the threaded section representing about 40% of the circumference of the yoke. As these threads are exposed, they oftentimes corrode to such an extent that when an attempt is made to draw up the packing nut, extreme force must be applied thereto with the result that the yoke buckles and must be repaired or replaced. Rust on the threads has resulted in a collapse of the small section pieces of the yoke and a consequent slipping of the packing nut. Additionally, the threading of the outside of the yoke involves hobbing which is a slow and expensive method of machining threads. Moreover, the exposed position of these threads renders them liable to burring with the result that they are oftentimes ruined in handling both before and after assembly.

In overcoming the aforesaid disadvantages, it is a major object of my invention to provide a novel bonnet type valve of relatively simple construction wherein increased efficiency in packing is secured independent of the yoke with a corresponding relief of the latter from undue stress.

Still a further object of my invention is the provision of a novel bonnet type valve having a packing gland or packing assembly wherein the force applied to the packing gland to effect packing also operates to aid in maintaining a sealing connection between the housing end of the bonnet and the valve housing.

A preferred embodiment of my invention is illustrated in the accompanying drawing wherein.

Figure 1:
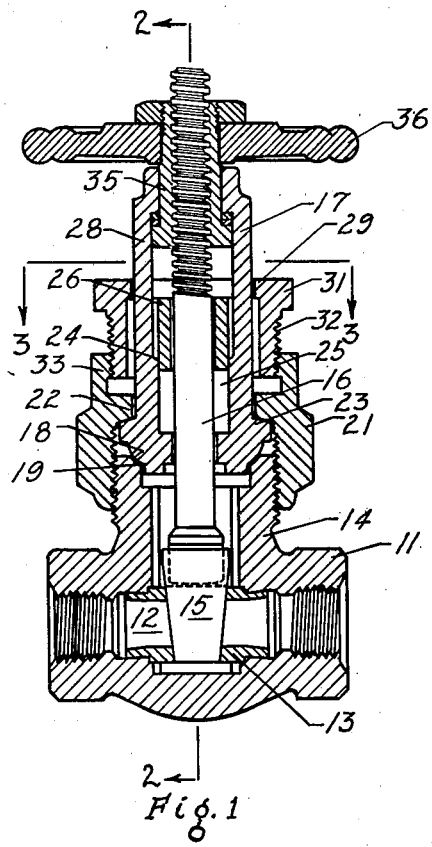
Figure 1 is a section through a valve embodying the present invention.
Figure 2:
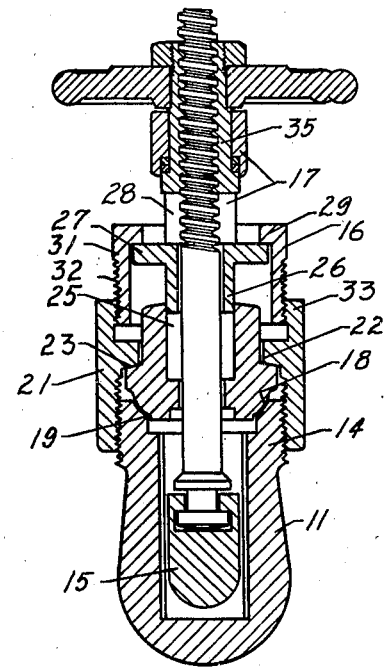
Figure 2 is a section through the valve of Figure 1 taken on the line 2—2.
Figure 3:
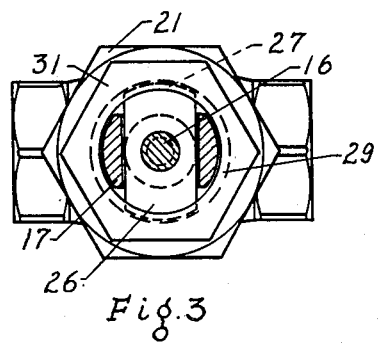
Figure 3 is a section taken through the valve of Figure 1 on the line 3—3.

In the valve of the present invention, the bonnet nut, which in prior valves, functioned only to secure the bonnet to the valve housing, is provided with an outwardly projecting skirt, the latter being threaded or otherwise formed to receive a like threaded section of a packing nut of sufficient size to surround the bonnet yoke. The packing nut is arranged, when drawn up, to engage and draw up a packing gland which is positioned within the bonnet around the valve stem. In this manner, the packing nut operates independently of the yoke and does not exert any force thereon. The bonnet nut continues its normal function of holding the bonnet in position, the holding force developed by the bonnet nut being supplemented by the force developed by the packing nut to increase the efficiency of the seal between the end of the bonnet and the valve housing.

The valve shown in the drawing includes a housing 11 having a fluid passage 12, a valve seat 13, and a projecting hollow externally threaded boss 14; a valve 15, of the gate type having a stem 16 extending from boss 14, a bonnet 17 having a ground or lapped surface or gasket joint 18 arranged to engage a complemental surface 19 on boss 14 in sealing relation, and a bonnet nut 21 threaded on boss 14 and provided with an inwardly extending flange 22 arranged to engage an outwardly extending flange 23 on bonnet 17. Thus when bonnet nut 21 is drawn up, surfaces 18 and 19 are brought into sealing relation. The latter are preferably rounded or semi-spherical to permit a slight amount of tilting of the bonnet and the valve stem to permit line contact and provide maximum unit pressure.

Bonnet 17 completely encircles valve stem 16 up to shoulders 24, the chamber 25 defined there between being arranged to receive suitable packing (not shown) and a packing gland 26. The latter is arranged to slide on the valve stem and is provided with side flanges 27 at its top projecting beyond arms 28 of the bonnet yoke and arranged to be engaged by an over-hanging flange 29 on a packing nut 31 which surrounds the bonnet yoke and is externally threaded at 32 to engage the threads of a skirt 33 projecting from the topside of bonnet nut 21.

Valve stem 16 extends upwardly through a collar 35 at the top of bonnet 17 and is conventionally threaded and provided with a handwheel 36 whereby the valve stem can be moved up and down in the bonnet and valve 15 opened and closed.

By drawing up bonnet nut 21, surfaces 18 and 19 are brought into sealing relation and bonnet 17 secured in place. When packing nut 31 is drawn up, packing gland 26 is forced down into packing chamber 25 to compress the packing therein. As packing nut 31 engages only skirt 33 on bonnet nut 21, and is provided with an appreciable amount of clearance around the bonnet yoke, its operation is entirely independent of the yoke and no strain is imposed on the yoke incident to the tightening of the packing. On the contrary, the drawing up of the packing nut not only compresses the packing but also increases the pressure between surfaces 18 and 19, thereby increasing the efficiency of the seal.

In the present valve, the yoke is not weakened by any threads thereon and no expensive machining operation such as hobbing is required in its manufacture.

While the present invention has been illustrated in connection with a gate valve, it is to be understood that it is applicable as well to other types of valves including those of the globe, meter, and throttling type.

Having described my invention I claim:

1. In a valve of the bonnet type: a housing; a valve stem extending outwardly from said housing; said stem having an outer threaded portion and a packing portion between its threaded portion and its inner end; a bonnet arranged to support the extending portion of said valve stem, said bonnet having an inner end adjacent the inner end of the packing portion and an outer end adjacent the threaded portion; a bonnet nut secured to said housing and arranged to secure the inner end of said bonnet thereto; a packing gland about the packing portion of said valve stem; and means threaded to said bonnet nut and arranged to engage and maintain said packing gland in packing position.

2. In a valve of the bonnet type: a housing; a valve stem extending from said housing; a bonnet arranged to support the extending portion of said valve stem; a bonnet nut threaded on said housing and arranged to secure said bonnet thereto; a packing gland around said valve stem within said bonnet; and a nut slidably positioned on the outside of and out of operative engagement with said bonnet but threadedly engaging said bonnet nut and arranged to engage and maintain said packing gland in packing position.

3. A valve of the bonnet type comprising: a housing; a hollow projecting externally-threaded boss on said housing; a valve stem extending from said boss; a bonnet arranged to support the extending portion of said valve stem, one end of said bonnet being seated in the open end of said boss; a flange on said bonnet; a bonnet nut threaded on said boss and arranged to contact said bonnet flange to hold said bonnet in position, said bonnet nut having an upwardly projecting threaded skirt; a packing gland around said valve stem within said bonnet; and a nut threaded on said skirt and positioned outside of and out of operative engagement with said bonnet and arranged to engage and maintain said packing gland in packing position.

4. A valve of the bonnet type comprising: a housing; a valve stem extending from said housing; a bonnet arranged to support the extending portion of said valve stem; a bonnet nut secured to said housing and arranged to secure one end of the bonnet thereto in sealing relation; a packing gland on said valve stem; and means to draw up said packing gland and at the same time increase the force securing said bonnet to said housing.

5. A valve according to claim 4 wherein said means comprises: a nut slidably mounted on said bonnet and arranged to be adjustably secured to said bonnet nut.

6. In a valve of the bonnet type: a housing; a valve stem extending outwardly from said housing, said stem having an outer threaded portion and a packing portion between its threaded portion and its inner end; a bonnet arranged to support the extended portion of said valve stem, said bonnet having an inner end portion completely encircling the packing portion of the stem and spaced therefrom to provide a packing chamber, an outer end portion completely encircling the threaded portion of said stem and an intermediate portion which is slotted; a bonnet nut securing the inner end of said bonnet firmly to said housing; a packing gland extending around the valve stem with its inner end extending into said packing chamber and with its outer end projecting outwardly through the slots of said bonnet; and means adjustably connecting projecting portions of the packing gland to the bonnet nut for adjustably pulling the packing gland inwardly against the packing, said means extending outside of and out of operative engagement with the bonnet.

7. The valve of claim 6 wherein said connecting means comprises: a packing nut threaded at one end to the bonnet nut and provided adjacent its other end with an internal annular shoulder extending over the projecting portions of the packing gland so as to engage and pull the gland inwardly when the packing nut is screwed inwardly along the bonnet nut.

JOSEPH A. ZWISHENBERGER.